(12) United States Patent
Kumar et al.

(10) Patent No.: US 9,454,380 B2
(45) Date of Patent: Sep. 27, 2016

(54) COMPUTING PLATFORM PERFORMANCE MANAGEMENT WITH RAS SERVICES

(71) Applicant: Intel Corporation, Santa Clara, CA (US)

(72) Inventors: Mohan Kumar, Aloha, OR (US); Sarathy Jayakumar, Portland, OR (US); Jose Andy Vargas, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 13/977,593

(22) PCT Filed: Nov. 21, 2012

(86) PCT No.: PCT/US2012/066376
§ 371 (c)(1),
(2) Date: Jun. 28, 2013

(87) PCT Pub. No.: WO2013/078397
PCT Pub. Date: May 30, 2013

(65) Prior Publication Data
US 2014/0258701 A1    Sep. 11, 2014

Related U.S. Application Data

(60) Provisional application No. 61/563,030, filed on Nov. 22, 2011.

(51) Int. Cl.
*G06F 9/00* (2006.01)
*G06F 15/177* (2006.01)
(Continued)

(52) U.S. Cl.
CPC .............. *G06F 9/4403* (2013.01); *G06F 1/26* (2013.01); *G06F 1/28* (2013.01); *G06F 1/3203* (2013.01); *G06F 1/324* (2013.01); *G06F 1/3234* (2013.01); *G06F 1/3275* (2013.01); *G06F 1/3296* (2013.01); *G06F 9/22* (2013.01); *G06F 9/44* (2013.01); *G06F 9/4401* (2013.01); *G06F 9/445* (2013.01); *G06F 11/3672* (2013.01); *G06F 17/30339* (2013.01); *G06F 1/206* (2013.01);
(Continued)

(58) Field of Classification Search
CPC .................................................... G06F 9/4403
See application file for complete search history.

(56) References Cited

U.S. PATENT DOCUMENTS 7,487,222 B2 *    2/2009    Begun et al. ................. 709/208
7,984,286 B2 *    7/2011    Zimmer ............... G06F 21/575
713/155

(Continued)

FOREIGN PATENT DOCUMENTS

WO    2013/078397 A1    5/2013

OTHER PUBLICATIONS

Advanced Configuration and Power Inteface Specification, Revision 5.0, Dec. 6, 2011.*
(Continued)

*Primary Examiner* — Mohammed Rehman
(74) *Attorney, Agent, or Firm* — Green, Howard & Mughal, LLP

(57) ABSTRACT

In some embodiments, a PPM interface may be provided with functionality to facilitate to an OS RAS services for one or more hardware components, regardless of a particular platform hardware configuration, as long as the platform hardware and OS are in conformance with the PPM interface.

16 Claims, 11 Drawing Sheets

(51) Int. Cl.

| | |
|---|---|
| *G06F 9/44* | (2006.01) |
| *G06F 17/30* | (2006.01) |
| *G06F 9/445* | (2006.01) |
| *G06F 1/28* | (2006.01) |
| *G06F 11/36* | (2006.01) |
| *G06F 1/26* | (2006.01) |
| *G06F 9/22* | (2006.01) |
| *G06F 11/34* | (2006.01) |
| *G06F 9/30* | (2006.01) |
| *G06F 1/20* | (2006.01) |
| *G06F 15/78* | (2006.01) |
| *G06F 1/32* | (2006.01) |
| *G06F 9/38* | (2006.01) |

(52) U.S. Cl.
CPC ............... *G06F 1/32* (2013.01); *G06F 9/3012* (2013.01); *G06F 9/30098* (2013.01); *G06F 9/384* (2013.01); *G06F 11/3447* (2013.01); *G06F 11/3466* (2013.01); *G06F 15/7871* (2013.01); *G06F 2209/501* (2013.01); *G06F 2217/78* (2013.01); *Y02B 60/1217* (2013.01); *Y02B 60/1285* (2013.01)

(56) References Cited

U.S. PATENT DOCUMENTS

| | | | | |
|---|---|---|---|---|
| 2004/0024867 | A1* | 2/2004 | Kjellberg | G06F 17/30905 709/224 |
| 2005/0283599 | A1* | 12/2005 | Zimmerman | G06F 9/4403 713/2 |
| 2008/0168432 | A1* | 7/2008 | Ayachitula | G06F 8/4434 717/158 |
| 2009/0144472 | A1* | 6/2009 | Montgomery | G06F 21/85 710/261 |
| 2009/0164747 | A1* | 6/2009 | Harikumar | G06F 12/0284 711/202 |
| 2009/0300332 | A1* | 12/2009 | Montgomery | G06F 11/3656 712/220 |
| 2009/0304022 | A1* | 12/2009 | Yang | H04L 49/9063 370/463 |
| 2011/0320798 | A1* | 12/2011 | Zimmer | G06F 21/14 713/2 |
| 2012/0019351 | A1* | 1/2012 | Bougaev | G06F 11/3031 340/3.5 |

OTHER PUBLICATIONS

International Search Report received for PCT Patent Application No. PCT/US2012/066376, mailed on May 30, 2013, 3 pages.

Hewlett Packard, "Technologies in HP Integrity server blades (BL860c i2, BL870c i2, and BL890c i2)", Technical white paper, Hewlett Packard Development Company, Apr. 2010, 16 pages.

Skalsky et al. "Intoducing UEFI-Compliant Firmware on IBM System x and BladeCenter Servers", Revision 1.2, Jan. 2011, pp. 1-29.

"Red Hat Enterprise Linux Progresses To Next Level of RAS", White paper, IDEAS International custom consulting services, Nov. 2010, pp. 1-13.

Hewlett Packard Corporatlon, "Advanced Configuration and Power Interface Specification", Revision 4.0a, Apr. 5, 2010, 731 pages.

International Preliminary Report on Patentability received for PCT Patent Application No. PCT/US2012/066376, mailed on Jun. 5, 2014, 7 pages.

International Written Opinion received for PCT Patent Application No. PCT/US2012/066376, mailed on Mar. 27, 2013, 5 pages.

* cited by examiner

Fig. 6

| Field | Byte Length | Byte Offset | Description |
|---|---|---|---|
| Header | | | |
| Signature | 4 | 0 | 'RASF' is Signature for RAS Feature Table |
| Length | 4 | 4 | Length in bytes for entire RASF. The length implies the number of Entry fields at the end of the table. |
| Revision | 1 | 8 | 1 |
| Checksum | 1 | 9 | Entire table must sum zero. |
| OEMID | 6 | 10 | OEM ID |
| OEM Table ID | 8 | 16 | The table ID is the manufacturer model ID |
| OEM Revision | 4 | 24 | OEM revision of table for supplied OEM Table ID |
| Creator ID | 4 | 28 | Vendor ID of utility that created the table. |
| Creator Revision | 4 | 32 | Revision of utility that created the table. |
| RASF Specific Entries | | | |
| RASF Platform Communication Channel Identifier | 12 | 36 | Identifier of the RASF Platform Communication Channel. OSPM should use this value to identify the PCC Sub channel structure in the RASF table. |

Fig. 8

| Command | Description |
|---|---|
| 0x00 | Reserved |
| 0x01 | Execute RASF Command. |
| 0x02-0xFF | All other values are reserved. |

Fig. 9

| Bit | RAS feature | Description |
|---|---|---|
| 0 | Hardware based patrol scrub supported | Indicates that platform support hardware based patrol scrub of DRAM memory. |
| 1 | Hardware based patrol scrub supported and exposed to software | Indicates that platform support hardware based patrol scrub of DRAM memory and platform exposes this capability to software using this RASF mechanism. |
| 2-127 | *Reserved* | Reserved for future use |

Fig. 7

| Field | Byte Length | Byte Offset | Description |
|---|---|---|---|
| Signature | 4 | 0 | The PCC Signature of 0x52415346 (corresponds to ASCII signature of RASF) |
| Command | 2 | 4 | PCC command field: see Table 5-76 and Section 14. |
| Status | 2 | 6 | PCC status field: see Section 14. |
| Communication Space | | | |
| Version | 2 | 8 | Byte 0 - Minor Version<br>Byte 1 - Major Version |
| RAS Capabilities | 16 | 10 | Bit Map describing the platform RAS capabilities as shown in Section 5.2.20.4.<br><br>The platform populates this field. The OSPM uses this field to determine the RAS capabilities of the platform. |
| Set RAS Capabilities | 16 | 26 | Bit Map of the RAS features for which the OSPM is invoking the command. The BIT Map is described in Section 5.2.20.4.<br>OSPM sets the bit corresponding to a RAS capability to invoke a command on that capability. The bitmap implementation allows OSPM to invoke a command on each RAS features supported by the platform at the same time. |
| Number of RASF Parameter blocks | 2 | 42 | The Number of parameter blocks will depend on how many RAS Capabilities the Platform Supports. Typically, there will be one Parameter Block per RAS Feature, using which that feature can be managed by OSPM. |
| Set RAS Capabilities Status | 4 | 44 | Status<br>0000b = Success<br>0001b = Not Valid |

TO Fig. 7 (cont.)

TO Fig. 7 (cont.)

FROM Fig. 7             FROM Fig. 7

| | | | |
|---|---|---|---|
| | | | 0010b = Not Supported<br>0011b = Busy<br>0100b = Failed<br>0101b = Aborted<br>0110b = Invalid Data |
| Parameter Blocks | Varies (N Bytes) | 48 | Start of the parameter blocks, the structure of which is shown in Table 5-80.<br><br>These parameter blocks are used as communication mailbox between the OSPM and the platform, and there is 1 parameter block for each RAS feature.<br><br>NOTE: There can be only one parameter block per type. |

| Field | Byte Length | Byte Offset | Description |
|---|---|---|---|
| Type | 2 | 0 | 0x0000 - Patrol Sub |
| Version | 2 | 2 | Byte 0 - Minor Version<br>Byte 1 - Major Version |
| Length | 2 | 4 | Length, in bytes of the entire parameter block structure |
| Patrol Scrub Command (INPUT) | 2 | 6 | 0x01 - GET_PATROL_PARAMETERS<br>0x02 - START_PATROL_SCRUBBER<br>0x03 - STOP_PATROL_SCRUBBER |
| Requested Address Range (INPUT) | 16 | 8 | OSPM Specifies the BASE (Bytes 7:0) and SIZE (Bytes 15:8) of the address range to be patrol scrubbed.<br><br>OSPM sets this parameter for the following commands<br>GET_PATROL_PARAMETERS<br>START_PATROL_SCRUBBER |
| Actual Address Range (OUTPUT) | 16 | 24 | The platform returns this value in response to GET_PATROL_PARAMETERS. The platform calculates the nearest patrol scrub boundary address from where it can start. This range should be a superset of the Requested Address Range.<br><br>BASE (Bytes 7:0) and SIZE (Bytes 15:8) of the address |
| Flags (OUTPUT) | 2 | 40 | The platform returns this value in response to GET_PATROL_PARAMETERS<br><br>BIT 0: Will be set if patrol scrubber is already running for address range specified in "Actual Address Range" |

FROM Fig. 10        FROM Fig. 10

| | | | |
|---|---|---|---|
| | | | BITs 1-3: Current Patrol Speeds, if BIT 0 is set<br>000b - Slow<br>100b - Medium<br>111b - Fast<br>All other combinations are reserved.<br><br>BITs 4 - 15: RESERVED |
| Requested Speed (INPUT) | 1 | 42 | The OSPM Sets this field as follows, for the START_PATROL_SCRUBBER command<br><br>BIT 0: Will be set if patrol scrubber is already running for address range specified in "Actual Address Range"<br><br>BITs 0-2: Requested Patrol Speeds<br>000b - Slow<br>100b - Medium<br>111b - Fast<br>All other combinations are reserved.<br><br>BITs 3 - 7: RESERVED |

Fig. 10 (cont.)

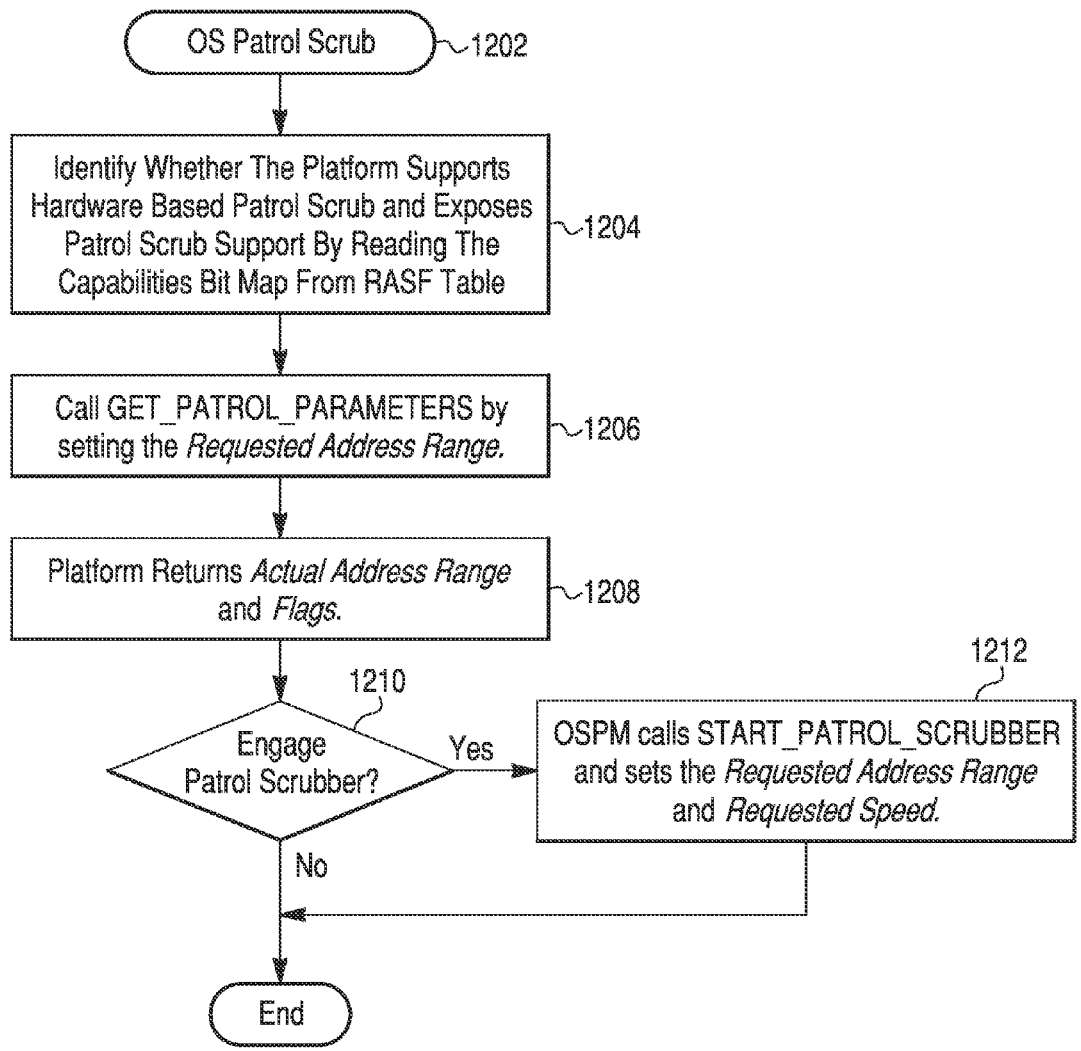

COMPUTING PLATFORM PERFORMANCE MANAGEMENT WITH RAS SERVICES

This application claims the benefit of, and incorporates by reference herein, U.S. Provisional Patent App. No. 61/563,030, filed on Nov. 22, 2011.

BACKGROUND

The present invention relates generally to a platform performance management interface. In particular, it pertains to providing RAS services through a performance management interface in a computing platform.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 represents a table structure for an RAS table format an ACPI implementation in accordance with some embodiments.

FIG. 7 represents a table structure for an RASF Platform Communication Channel Shared Memory Region in an ACPI implementation in accordance with some embodiments.

FIG. 8 represents a table structure for PCC Command Codes used by an RASF PCC in accordance with some embodiments.

FIG. 9 is a structure identifying RAS capabilities bitmap in accordance some embodiments.

FIG. 10 is a table indicating Parameter Block Structure for PATROL SCRUB tasks in accordance with some embodiments.

FIG. 12 is a flow diagram showing a routine for performing ACPI Patrol Scrub with the table structures of FIGS. 7-11 in accordance with some embodiments.

DETAILED DESCRIPTION

Figure 1:
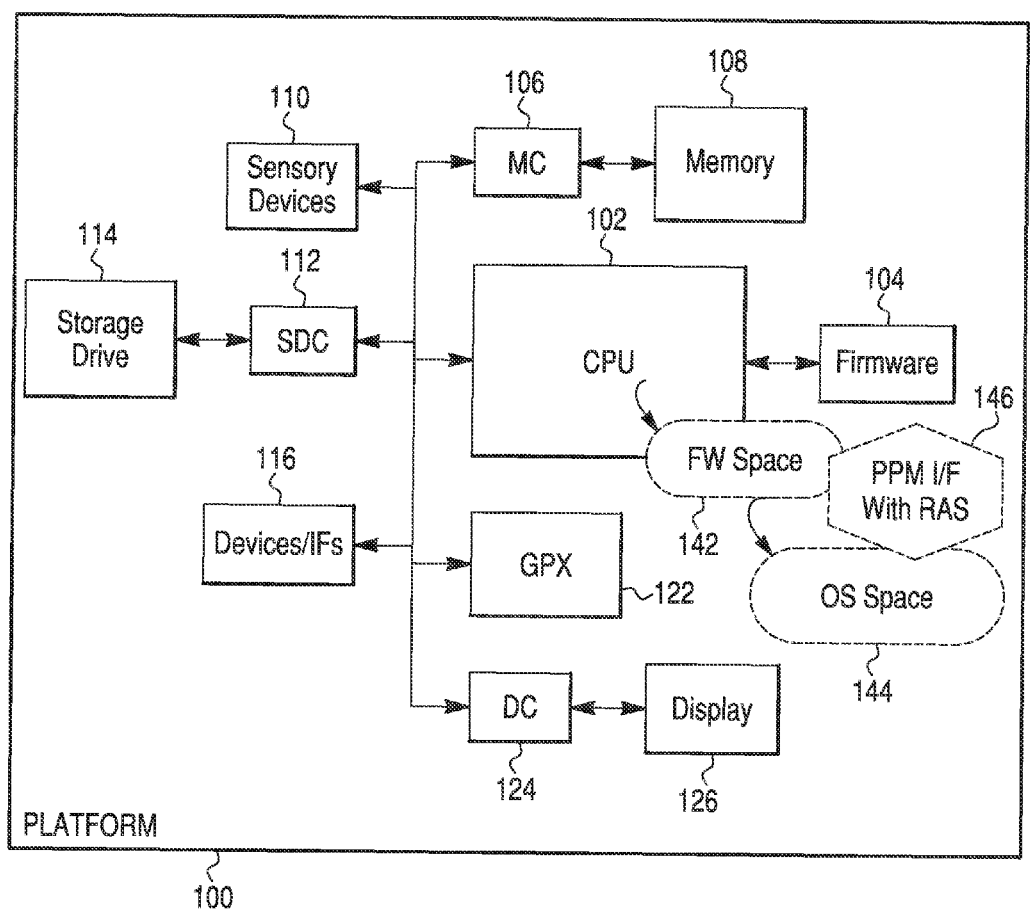
FIG. 1 is a block diagram of a computing platform with RAS support provided through a PPM interface in accordance with some embodiments.

FIG. 1 is a diagram of a portion of a computing platform 100 with a performance and power management (PPM) interface facilitating RAS services in accordance with some embodiments. The computing platform, as generally illustrated in the figure, is intended to represent a variety of different computing platform types including but not limited to servers, desktop PCs, netbooks, ultra-books, tablets, smart-phones, and the like. For simplicity and ease of understanding, details and/or components, not pertinent to this disclosure, for some platform embodiments will have been omitted.

As used herein, the term "PPM" stands for performance and power management and refers to any suitable interface for enabling operating systems, as well as applications through their operating systems, to control, monitor, maintain, etc., hardware components within a platform, as long as the platform and OS. at least with regard to a relevant feature, comply with the PPM interface. An example of a PPM is the Advanced Configuration and Power Interface (ACPI).

RAS services, in some implementations, refers to "reliability", "accessibility", and "serviceability" services provided to the platform operating system and/or applications for platform hardware features. Computing platforms designed with higher levels of RAS may have a multitude of features that help them stay available without failure. For example, a memory controller might monitor a memory component to maintain information on which of its address ranges are operable (sometimes referred to as a scrub or patrol scrub), or to what degree they are reliable. This is information that an application or operating system might otherwise have to generate on its own, e.g., via a suitable memory scan or the like. However, with some embodiments, such RAS services may be more effectively and/or efficiently provided to the OS through a PPM interface, making their availability to the OS independent of any particular platform, so long as the particular platform complies with the PPM interface.

The depicted platform comprises a CPU 102, sensory devices 110 (e.g., gyros, speakers, cameras, etc.), other devices/interfaces (e.g., keypad, pointer device, USB ports, PCI ports, wireless Ifs, etc.) 116, and a graphics processor (GPX) 122, coupled together through one or more busses and/or point-to-point interconnects. The platform also includes memory 108 (e.g., DRAM) coupled through a memory controller 106 to at least the CPU 102, and it also includes firmware 104 (e.g., implemented with non-volatile memory such as flash memory) coupled to the CPU 102. The platform additionally includes a display 126 coupled through a display controller 124 to the GPX 122 and/or to the CPU 102. (it should be appreciated that while a single CPU block is shown, the platform may include multiple CPUs and/or processing cores for executing one or more OS threads and for performing various different tasks. However, for simplicity, a single CPU executing an operating system is shown herein.)

The platform further includes a storage drive 114 (e.g., a solid state drive) coupled through a storage drive controller 112 to at least the CPU 102. The storage drive may store data, applications, and one or more operating systems (OS) such as Linux, Windows™, Mac OS™, Android, etc., systems. The firmware 104 includes a BIOS, EFI or other boot/initialization software. (Note that the role of the BIOS has changed over time. For example, in some platforms, the BIOS is being replaced by the more complex EFI (Extensible Firmware Interface), but a BIOS for firmware remains in widespread use. To date, EFI has been supported in Microsoft Windows™ versions supporting GPT, in the Linux kernel 2.6.1 and later, and in Mac OS. However, the distinction between BIOS and EFI is rarely made in terminology by the average computer user, making BIOS a catch-all term for both systems. For simplicity, however, the term "firmware" will be used generally to refer to the BIOS, EFI or alternative boot/initialization code.)

Together, the operating system and firmware include software components to implement a PPM interface 146 for the platform. As abstractly represented in the figure, when the platform starts up, after executing primitive start code, the CPU retrieves and runs the boot software (firmware space 142) and among other things, at that time may establish data structures for the PPM interface 146. Once the firmware space (e.g., BIOS, EFI) has initialized, the OS space 144 is then established as the OS boots within the CPU. At this time, PPM modules within the OS may identify various characteristics of the platform through the PPM interface 146 that is being established.

Figure 2:
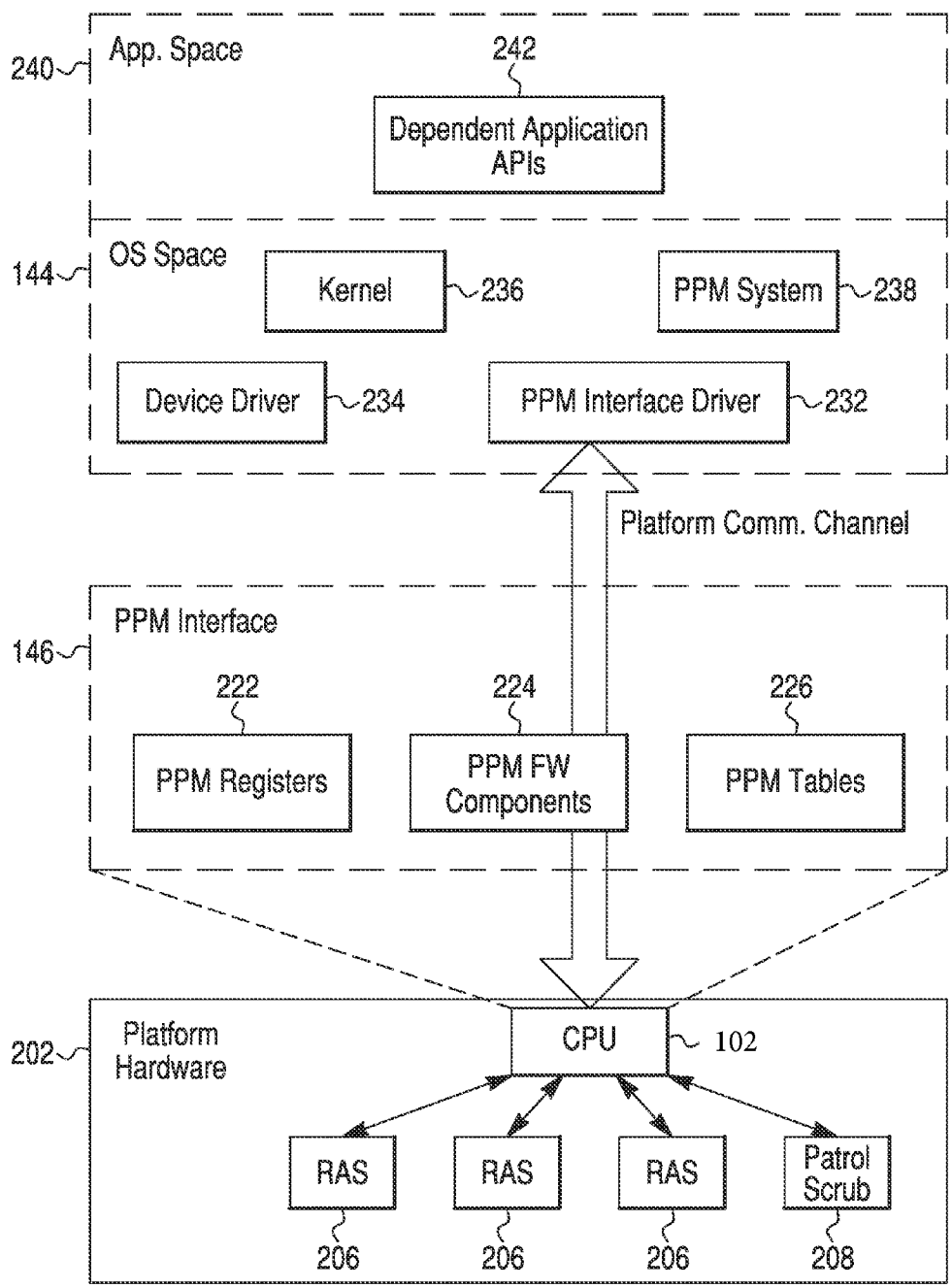
FIG. 2 is a diagram showing an abstracted representation of a PPM interface implemented on a platform in accordance with some embodiments.

FIG. 2 is a block diagram abstractly showing a PPM interface for interfacing between OS power and performance functionality, on the one hand, and platform hardware, on the other hand. (It should be noted that this diagram is drawn from an ACPI specification, which henceforth, is used primarily as an example for conveniently presenting some of the principles taught herein. However, the figure has been abstracted and modified to conform with concepts particular to this disclosure. For example, the more general term: "PPM" is used rather than "ACPI" in some places and instead of "OSPM" within the OS space. It should be appreciated that ACPI is a specific implementation of a PPM interface.)

With pertinence to the present disclosure, platform hardware 202 is shown with CPU 102 and RAS provider units 206 including a patrol scrub unit 208. The RAS provider units, including the patrol scrub unit, may correspond to specific circuits, logic units, controllers, executing software, etc. They are capable of generating, identifying, or retrieving RAS data for an associated platform hardware unit. For example, the patrol scrub unit 208 may correspond to a memory controller coupled to memory (not shown) that is capable of performing patrol scrub operations for a memory and sending the results back to a data structure in the PPM interface 146, e.g., to update a PPM table (discussed below).

The CPU 102, as discussed above, executes firmware and the OS, thereby establishing the PPM interface 146, OS Space 144, and application space 240. The application space includes APIs 242 for applications to run on the platform. The OS space 144 includes PPM interface driver 232, device drivers 234, an OS kernel 236, and a PPM system 238, which facilitates performance and power management from the OS. In the depicted embodiment, a platform communications channel (PCC) is implemented by the PPM interface to communicate between the OS PPM functionality and the PPM hardware features.

The PPM interface 146 comprises PPM registers 222, PPM firmware components 224 and PPM tables 226. The registers 222 may correspond to specific registers, e.g., dedicated PPM registers in the hardware, e.g., within the CPU or as part of a controller such as a baseboard controller, or to virtual registers created in software. They also may be a constrained part of the hardware interface, described (at least in location) by the PPM Tables, ACPI, for example, defines a hardware register interface that an ACPI-compatible OS may use to control core power management and performance features of platform hardware, as described in Section of the ACPI 5.0 Specification (the ACPI Hardware Specification).

The PPM firmware components 224 include portions of the firmware corresponding to PPM implementations. Typically, they are used to implement interfaces for sleep, wake, and some restart operations. Pertinent to this disclosure, among other things, they may also include components for defining PPM data structures and tables, including those used for RAS services, and they may also include one or more routines for maintaining and/or updating data and/or addresses in the tables. (Note that some of the ACPI features corresponding to firmware components 224 are described in Section 5.3, "Namespace", of the ACPI 5.0 Specification).

The PPM tables, in general, describe the interfaces to the hardware. Some descriptions limit what can be built. For example, some controls may be embedded in fixed blocks of registers, and the table specifies the address of the register block. Most descriptions allow the hardware to be built in arbitrary ways and can describe arbitrary operation sequences needed to make the hardware function. (For the rest of the disclosure, ACPI tables will be described as examples of suitable PPM table structures. ACPI tables are generally described in Section 5.2 of the ACPI 5.0 Specification).

ACPI tables having "Definition Blocks" can make use of a pseudo-code type of language, the interpretation of which can be performed by the OS. That is, OSPM (corresponds to PPM system 238) includes and uses an interpreter that executes procedures encoded in the pseudo-code language and stored in the ACPI tables containing "Definition Blocks." The pseudo-code language, known as ACPI Machine Language (AML), is a compact, tokenized, abstract type of machine language.

Figure 3:
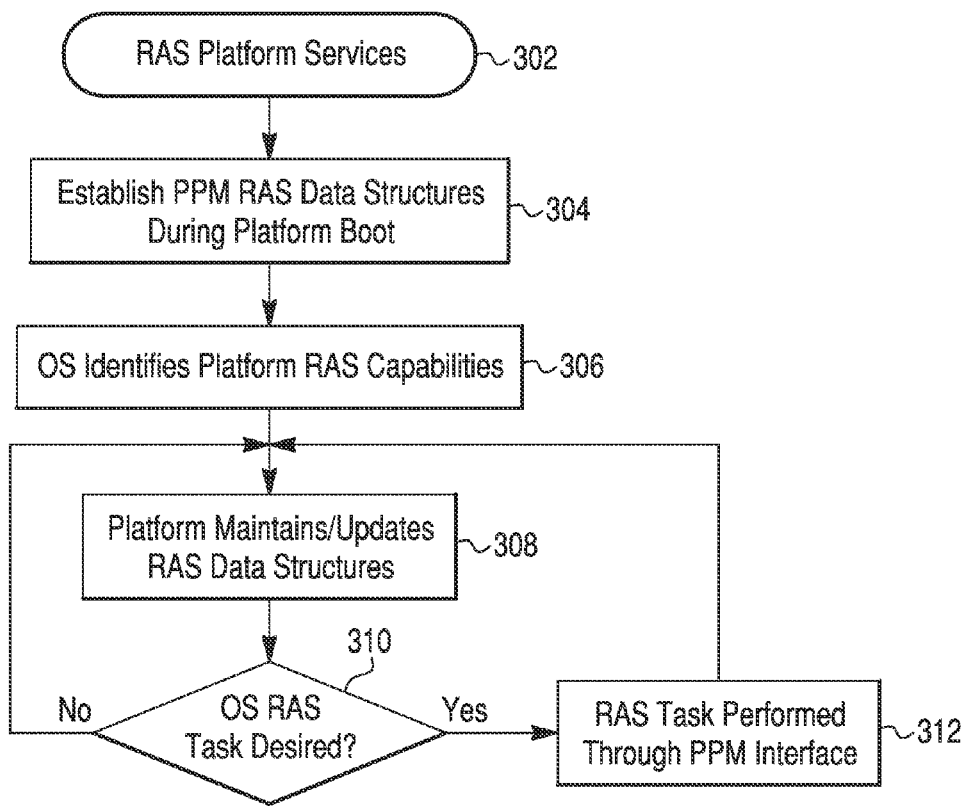
FIG. 3 is a general routine for providing RAS services through a PPM interface to a platform OS in accordance with some embodiments.

FIG. 3 shows a routine 302 for an OS to invoke an RAS platform service, in accordance with some embodiments. At 304, during the platform boot, PPM RAS data structures are created in association with the particular platform. That is, a benefit of using a PPM interface is that services may be made available to an OS without the need for a uniform or known platform configuration, as long as it complies with the PPM interface). Definition tables identifying available RAS services provided by various platform hardware components may be generated. This may be done, for example, by PPM components during a firmware boot process. In some ACPI implementations, the booting firmware may create the RAS tables in dedicated firmware memory space, e.g., space claimed by the firmware and not available for modification to the OS, i.e., made available to the OS on a read-only basis.

At 306, the OS identifies platform RAS capabilities. In some embodiments, this occurs when the OS is booted and initializes. PPM components (e.g., PPM system 238 from FIG. 2) identify the RAS data structures that were created and defined by the firmware PPM components.

At 308, the platform maintains/updates the RAS data structures. This will typically be ongoing while the platform is operating. Some RAS functionality may be provided from hardware, as previously discussed, with RAS providers generating and/or retrieving RAS data and providing it through the PPM interface to update the RAS tables. For example, a memory controller might monitor memory blocks or ranges to assess which are operational or to what degree they are reliable. They may then update an appropriate RAS data structure, e.g., PPM table associated with the memory.

Any suitable approach may be used to enable a RAS provider to update a RAS table. For example, it may use the PCC channel in an ACPI implementation. In some embodiments, a RAS provider may access the PPM interface by issuing a system interrupt to access a PPM component from the firmware. For example, in most x86 platforms, an SMI (system management interrupt) could be issued to place the system in system management mode (SMM), which results in an SMI handler routine in the platform firmware to be called. The SMI handler would process one or more OS RAS commands (e.g., as defined in the PPM components including data structures such as tables), update RAS structures (e.g., tables) with data from RAS providers, and/or invoke one or more PPM components, e.g., in firmware, for execution. (Note that as used herein, "system interrupt" refers to any interrupt in any type of platform architecture to cause a CPU to process a desired interrupt handler, a routine usually running outside of the operating system. So, with the present disclosure, it could be any interrupt used to invoke an interrupt handler to directly or indirectly invoke PPM components outside of OS space to service an OS's RAS task. Typically, but not always, the CPU will suspend running the OS and switch to run the interrupt handler. When finished, the interrupt handler may issue its own interrupt, e.g., ASI in x86 platforms, to return operation back to the OS. Interrupt handlers, such as an SMI handler in x86 platforms, may conveniently be part of platform firmware.)

At 310, if the OS has an RAS task to be performed, e.g., an application such as a database program needs to do a patrol scrub or access patrol scrub data, then at 312, the OS PPM component performs the RAS service request through the PPM interface. In some embodiments, it issues one or more suitable commands and/or address pointers, as defined in the appropriate RAS data structure and invokes the commands via the PPM interface. For example, it could issue a system interrupt (e.g., SMI) after writing command/address information to an appropriate location(s) defined in the table(s) and to ultimately be serviced by PPM components via the interrupt handler (e.g., SMI handler). On the other hand, at 310, if the OS did not need an RAS service, then the routine loops back to 308 as shown.

To give hardware vendors flexibility in choosing their implementation, ACPI uses tables to describe system information, features, and methods for controlling those features. These tables list devices, e.g., devices on the system board or devices that cannot be detected or power managed using some other hardware standard. They also may list system capabilities such as the sleeping power states supported, a description of the power planes and clock sources available in the system, batteries, system indicator lights, and so on. This enables OSPM (PPM system 238 in OS space for ACPI) to control system devices without needing to know how the system controls are implemented.

Figure 4:
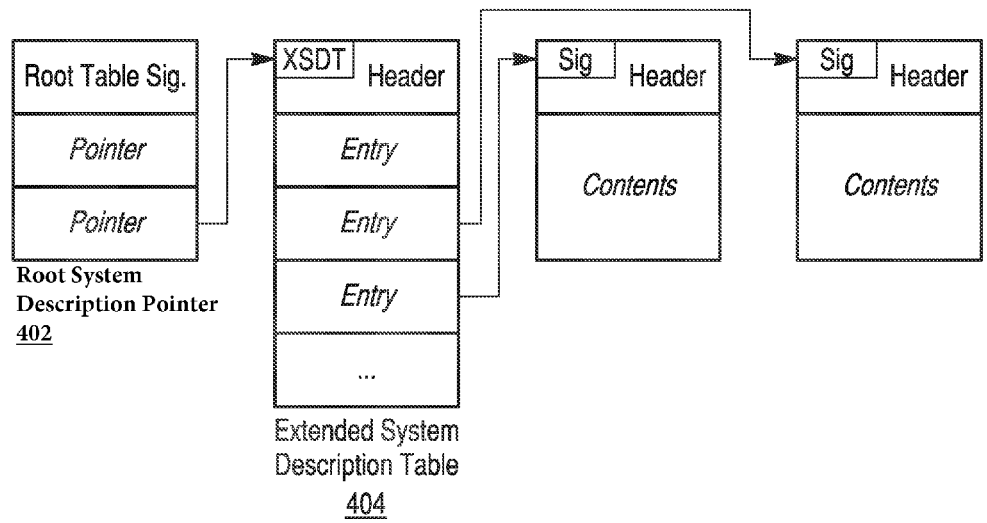
FIG. 4 is a diagram showing a root pointer to a table structure in an ACPI interface in accordance with some embodiments.

FIG. 4 shows a general structure for implementing such tables in accordance with some embodiments. A Root System Description Pointer (RSDP) structure 402 is located in the system's memory address space and may be setup by the platform firmware. This structure contains the address of the Extended System Description Table (XSDT) 404, which references other description tables that provide data to OSPM, supplying it with knowledge of the base system's implementation and configuration.

System description tables should start with identical headers. The primary purpose of the system description tables is to define for OSPM various industry-standard implementation details. Such definitions enable various portions of these implementations to be flexible in hardware requirements and design, yet still provide OSPM with the knowledge it needs to control hardware directly.

OSPM locates that Root System Description Table by following the pointer in the RSDP structure. The RSDT starts with the signature 'RSDT' followed by an array of physical pointers to other system description tables that provide various information on other standards defined on the current system. The OSPM examines each table for a known signature. Based on the signature, OSPM can then interpret the implementation-specific data within the table.

Figure 5:
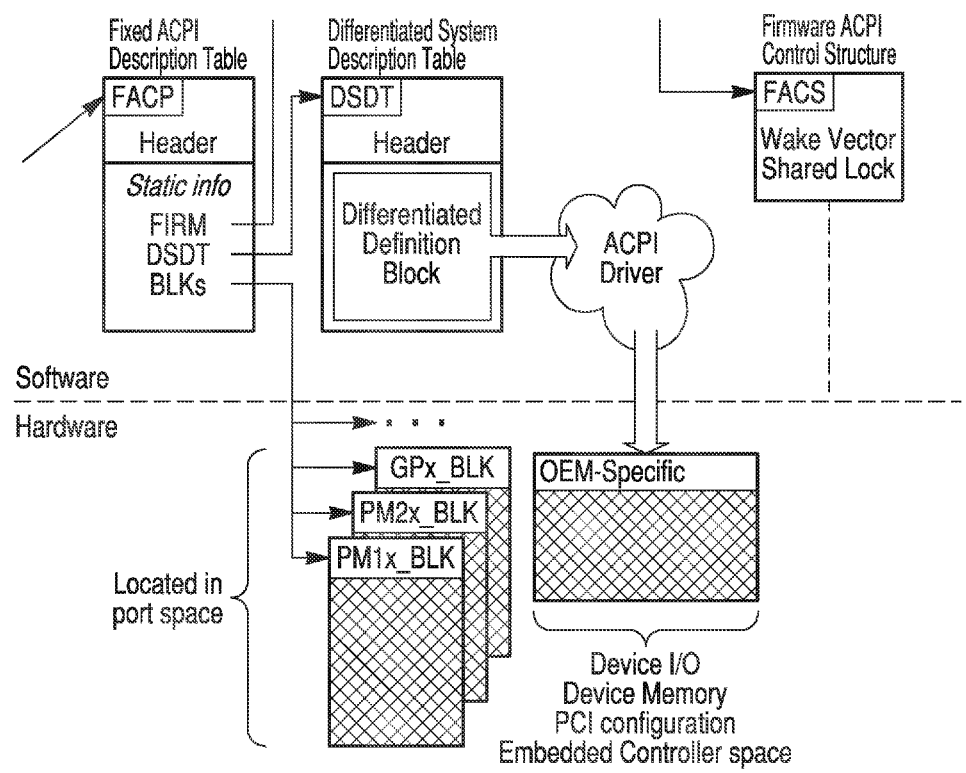
FIG. 5 is a diagram showing a description table structure for an ACPI interface in accordance with some embodiments.

With reference to FIG. 5, the Extended System Description Table (XSDT) is further described. It points to other tables in memory. The first table pointed to by pointer 402, the XSDT points to the Fixed ACPI Description table (FADT). The data within this table includes various fixed-length entries that describe the fixed ACPI features of the hardware. The FADT table refers to the Differentiated System Description Table (DSDT), which contains information and descriptions for various system features. The relationship between these tables is shown in FIG. 5.

When the OS initializes during boot, the OSPM finds the RSDP structure. When the OSPM locates the structure, it looks at the physical address for the Root System Description Table or the Extended System Description Table. The Root System Description Table starts with the signature "RSDT", while the Extended System Description Table starts with the signature "XSDT". These tables contain one or more physical pointers to other system description tables that provide various information about the system. As shown in FIG. 5, there should always be a physical address in the Root System Description Table for the Fixed ACPI Description table (FADT).

When OSPM follows a physical pointer to another table, it examines each table for a known signature. Based on the signature, OSPM can then interpret the implementation-specific data within the description table.

The purpose of the FADT is to define various static system information related to configuration and power management. The Fixed ACPI Description Table starts with the "FACT" signature. The FADT describes the implementation and configuration details of the ACPI hardware registers on the platform.

The GPE0_BLK and GPE1_BLK blocks provide the foundation for an interrupt-processing model for Control Methods. The P_BLK blocks are for controlling processor features. Besides ACPI Hardware Register implementation information, the FADT also contains a physical pointer to a data structure known as the Differentiated System Description Table (DSDT), which is encoded in Definition Block format.

A Definition Block contains information about the platform's hardware implementation details in the form of data objects arranged in a hierarchical (tree-structured) entity known as the "ACPI namespace", which represents the platform's hardware configuration. Definition blocks loaded by OSPM combine to form one namespace that represents the platform. Data objects are encoded in a format known as ACPI Machine Language or AML for short. Data objects encoded in AML are "evaluated" by an OSPM entity known as the AML interpreter. Their values may be static or dynamic. The AML interpreter's dynamic data object evaluation capability includes support for programmatic evaluation, including accessing address spaces (for example, I/O or memory accesses), calculation, and logical evaluation, to determine the result. Dynamic namespace objects are known as "control methods". OSPM "loads" or "unloads" an entire definition block as a logical unit—adding to or removing the associated objects from the namespace. The DSDT should be loaded by OSPM at boot time and should not be unloaded. It contains a Definition Block named the Differentiated Definition Block that contains implementation and configuration information OSPM can use to perform power management, thermal management, or Plug and Play functionality that goes beyond the information described by the ACPI hardware registers.

Definition Blocks can either define new system attributes or, in some cases, build on prior definitions. A Definition Block can be loaded from system memory address space. One use of a Definition Block is to describe and distribute platform version changes.

Definition blocks enable wide variations of hardware platform implementations to be described to the ACPI-compatible OS while confining the variations to reasonable boundaries. Definition blocks enable simple platform implementations to be expressed by using a few well-defined object names.

Some operators perform simple functions and others encompass complex functions. The power of the Definition Block comes from its ability to allow these operations to be glued together in numerous ways, to provide functionality to OSPM. The operators present are intended to allow many useful hardware designs to be ACPI-expressed, not to allow all hardware designs to be expressed.

FIG. 6-10 show the table structure of ACPI RAS features. FIG. 6 is a table showing the RASF table format. It indicates memory shared by the OS and firmware, as well as memory locations that the firmware owns that are to contain RAS data to be made available to the OS. (See also Section 15, "System Address Map interfaces" of the ACPI 5.0 Specification.)

The RASF PCC Sub Channel identifier is used by the OSPM to identify the PCC Sub Channel structure. The RASF table references its PCC Subspace by this identifier as shown in FIG. 6.

The OSPM will write PCC registers by filling in the register value in PCC sub channel space and issuing a PCC Execute command. (See FIG. 8). To minimize the cost of PCC transactions, the OSPM should ideally read or write all registers in the same PCC subspace via a single read or write command. The RASF Action Entries are defined in the PCC sub channel as shown in FIG. 7.

FIG. 9 is an ACPI table defining the Platform RAS capabilities. FIG. 10 is a table describing the Parameter Blocks. The structure is used to pass parameters for controlling the corresponding RAS Feature. Each RAS Feature is assigned a TYPE number, which is the bit index into the RAS capabilities bitmap described in the table of FIG. 9. This table (FIG. 10) is used to emulate controller, issue commands. The OS uses this table to issue the commands, e.g., with patrol scrub operations, specify scrub ranges, speed, etc.

Figure 11:
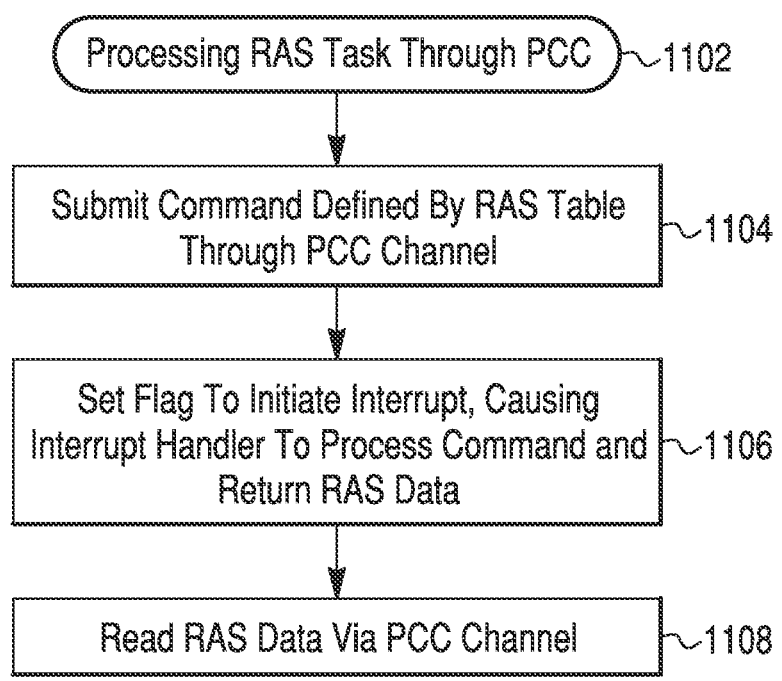
FIG. 11 is a general routine for processing a RAS task through a Platform Communications Channel (PCC) within a PPM interface in accordance with some embodiments.

FIG. 11 is a flow diagram illustrating a routine 1102 for generally processing an RAS task through a platform communications channel. (The PCC is described in Section 14 of the ACPI 5.0 Specification.) At 1104, the OS submits a command to an appropriate address, as defined by an RAS table, for the RAS task to be performed. Next, at 1106, the OS sets a flag to initiate a system interrupt. This causes an interrupt handler to process the command(s), or to invoke an ACPI routine to process the command(s), and to return responsive data back to the OS. In some embodiments, the OS writes values to certain addresses (as defined in the tables) and writes to a register for the system interrupt to initiate command execution.

The interrupt handler may then write RAS results data back into a designated address and set an appropriate flag to notify the OS that the data is available. From here, at 1108, the OS reads the data and uses it as intended.

FIG. 12 is a diagram illustrating a process flow 1202 of an OS (OSPM) implementing a patrol scrub task through an ACPI interface using the ACPI tables presented above. Initially, at 1204 (during OS boot), the OS determines whether the platform supports hardware based patrol scrub. If so, it exposes the capabilities to the OS space, and thus to the Application space as well, by reading the Capabilities Bit Map from the RAS Capabilities Bit Map (see FIGS. 7 and 9).

At 1206, the OSPM calls the GET_PATROL_PARAMETERS command (FIG. 10) by setting the requested address range. At 1208, the platform returns the Actual Address Range and flags (patrol scrub status, speed, etc.) for the OSPM (FIG. 10). Based on the returned patrol scrub parameters and flag information, if the OSPM decides to start a patrol scrub operation for the actual address range, then at 1212, the OSPM calls the START_PATROL_SCRUBBER command and sets the requested address range and requested speed.

The invention is not led to the embodiments described, but can be practiced with modification and alteration within the spirit and scope of the appended claims. It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme.

What is claimed is:

1. A computing platform, comprising:
   a non-volatile memory having a firmware boot program; and
   a processor to execute the firmware boot program when the processor is reset, the firmware boot program including instructions is to create Performance and Power Management (PPM) interface data structures including a Reliability Accessibility Serviceability (RAS) table structure, wherein the RAS table structure comprises a table for a RAS table format which is compatible with an Advanced Configuration and Power Interface (ACPI) implementation.

2. The computing platform of claim 1, in which the RAS table structure comprises a table for a RAS features (RASF) platform communication channel (PCC) shared memory region.

3. The computing platform of claim 2, in which the RAS table structure comprises a table for PCC command codes used by a RASF PCC structure.

4. The computing platform of claim 1, in which the RAS table structure comprises a table for identifying RAS capabilities bitmap.

5. The computing platform of claim 1, in which the RAS table structure comprises a table for indicating parameter block structure for a PATROL SCRUB task.

6. The computing platform of claim 1, in which the RAS table structure comprises a table for indicating a parameter block structure for one or more commands to indicate, to an Operating System (OS), reliability information for memory.

7. The computing platform of claim 6, in which the reliability information pertains to available reliable flash memory write cycles.

8. The computing platform of claim 1, in which the boot program comprises an Extensible Firmware Interface (EFI) program.

9. A computing platform, comprising:
a first memory storage device having instructions for an operating system (OS) including OS Performance and Power Management (PPM) components for a PPM interface; and
a second memory storage device, coupled to the first memory storage device via at least one integrated circuit, the second memory storage device having instructions for a firmware boot program including firmware PPM components for a PPM interface, the OS and firmware PPM instructions, when executed, are to establish a PPM interface between the OS and platform hardware, wherein the PPM interface includes a Reliability Accessibility Serviceability (RAS) data structure, to provide to the OS, RAS services.

10. The computing platform of claim 9, in which the OS is to identify available RAS services from the RAS data structure.

11. The computing platform of claim 10, in which the OS is to issue a command through a platform communications channel to receive an RAS service.

12. The computing platform of claim 9, in which the RAS data structure is to be updated at least by a firmware routine initiated from a system interrupt.

13. The computing platform of claim 12, comprising at least one RAS provider to provide data to update the RAS data structure.

14. The computing platform of claim 12, in which the firmware routine is to be called by an interrupt routine.

15. The computing platform of claim 9, in which updatable parts of the RAS structure are to exist in memory that is reserved by the firmware boot program.

16. An apparatus, comprising:
a computer platform having firmware including ACPI components to build a RAS features (RASF) table structure, wherein the RASF table structure comprises a platform RAS capabilities bitmap structure; and wherein the RASF table structure comprises a parameter block structure for memory scrub services.

* * * * *